March 14, 1967  A. G. JENSEN  3,308,972
LOAD SUPPORTING SYSTEM
Filed Oct. 12, 1964  12 Sheets-Sheet 1

INVENTOR
AXEL G. JENSEN
BY
Burgess, Ryan, & Hicks
ATTORNEYS

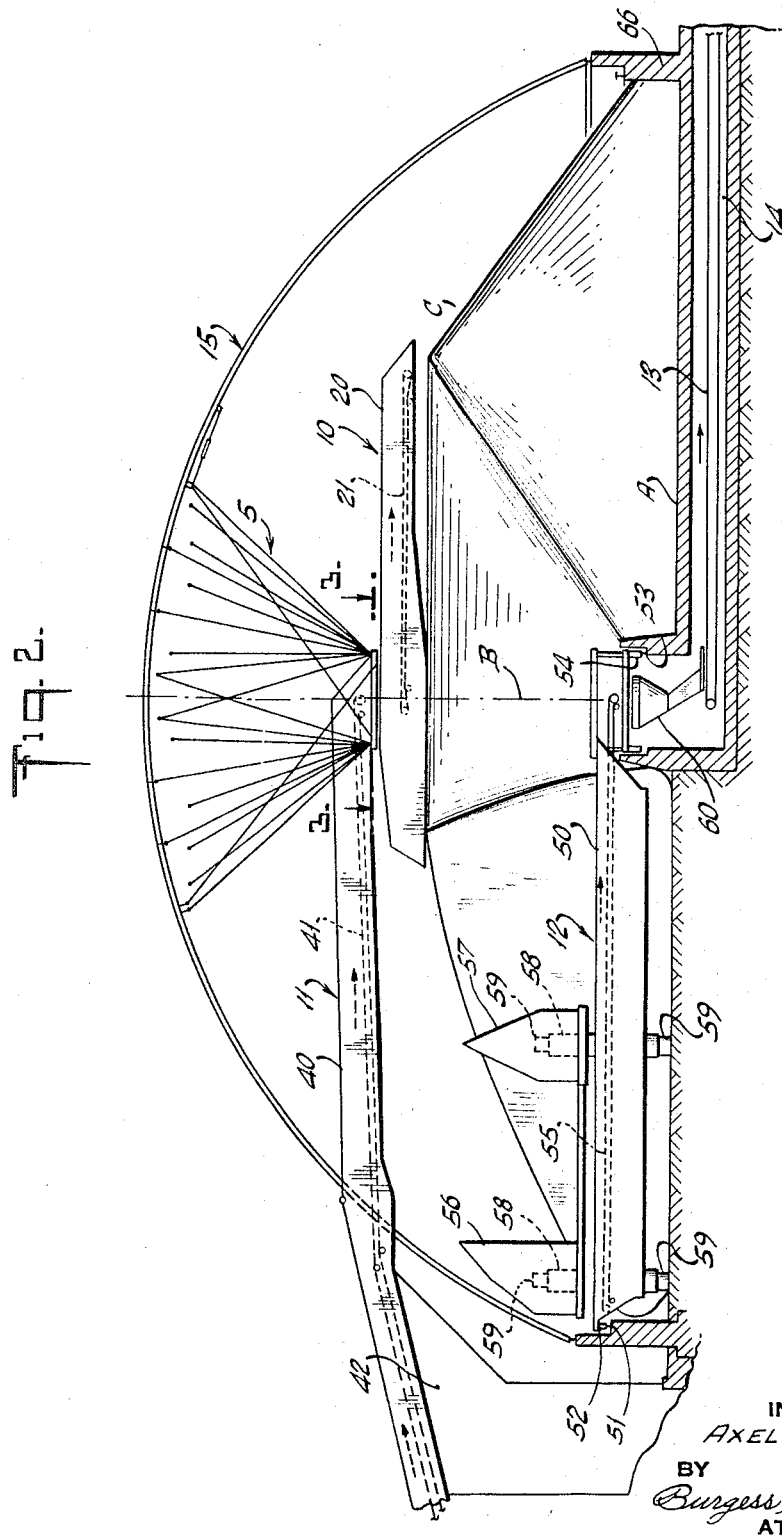

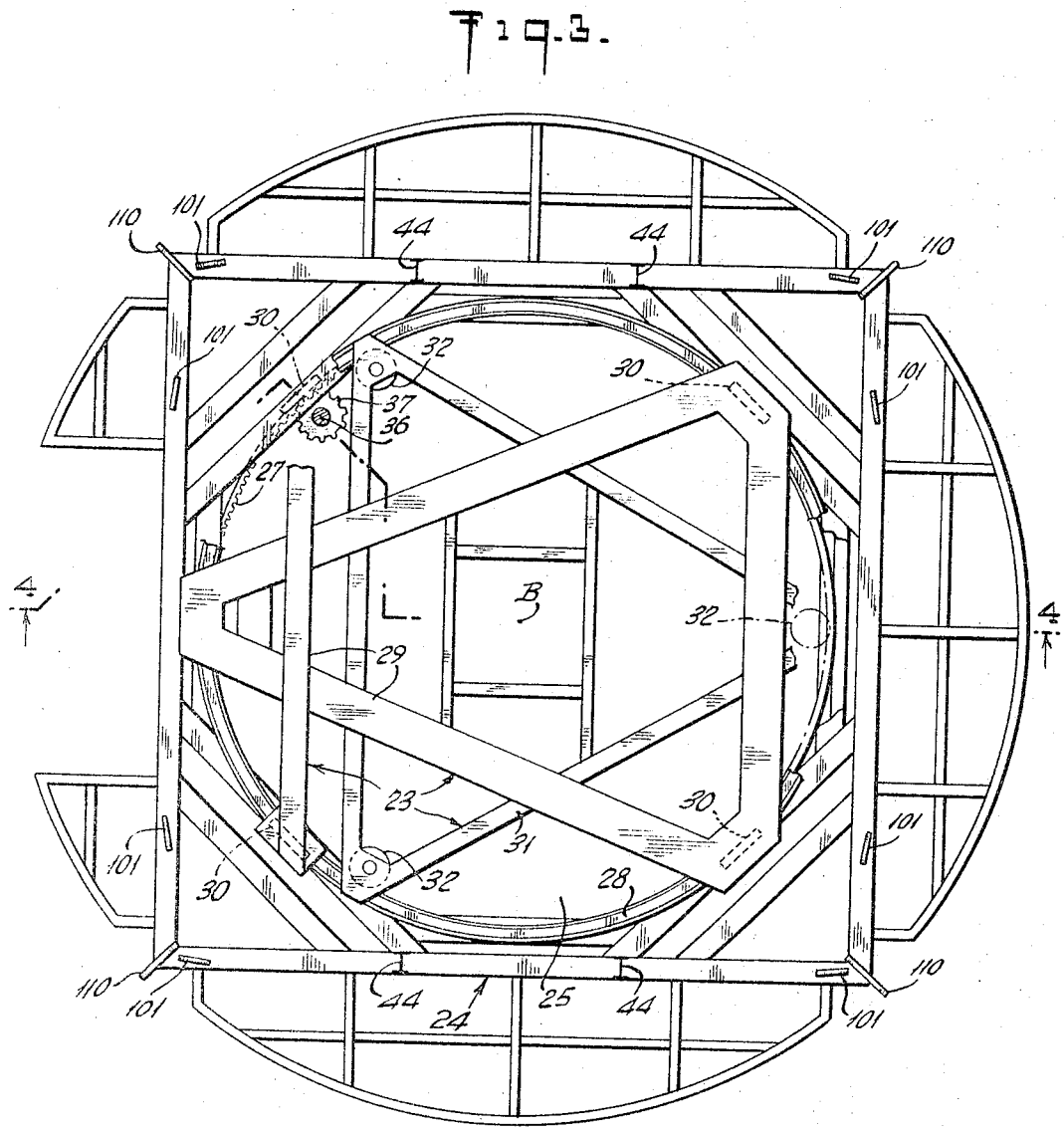

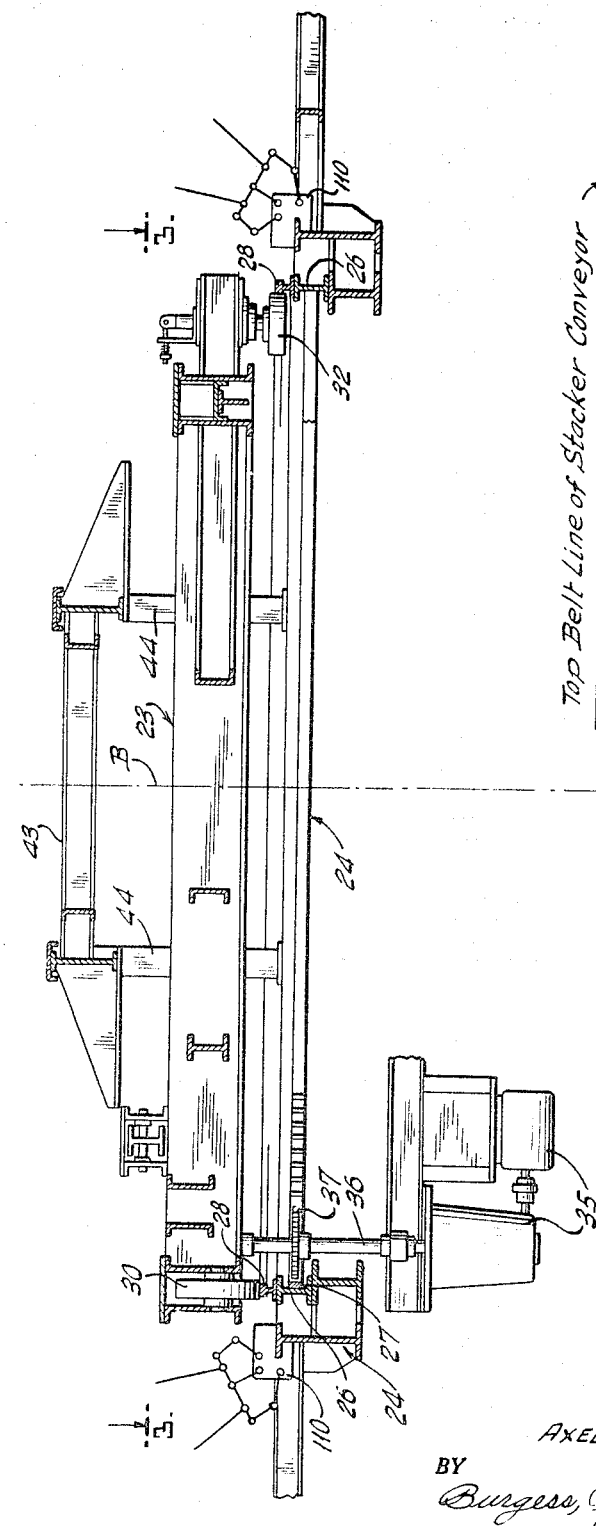

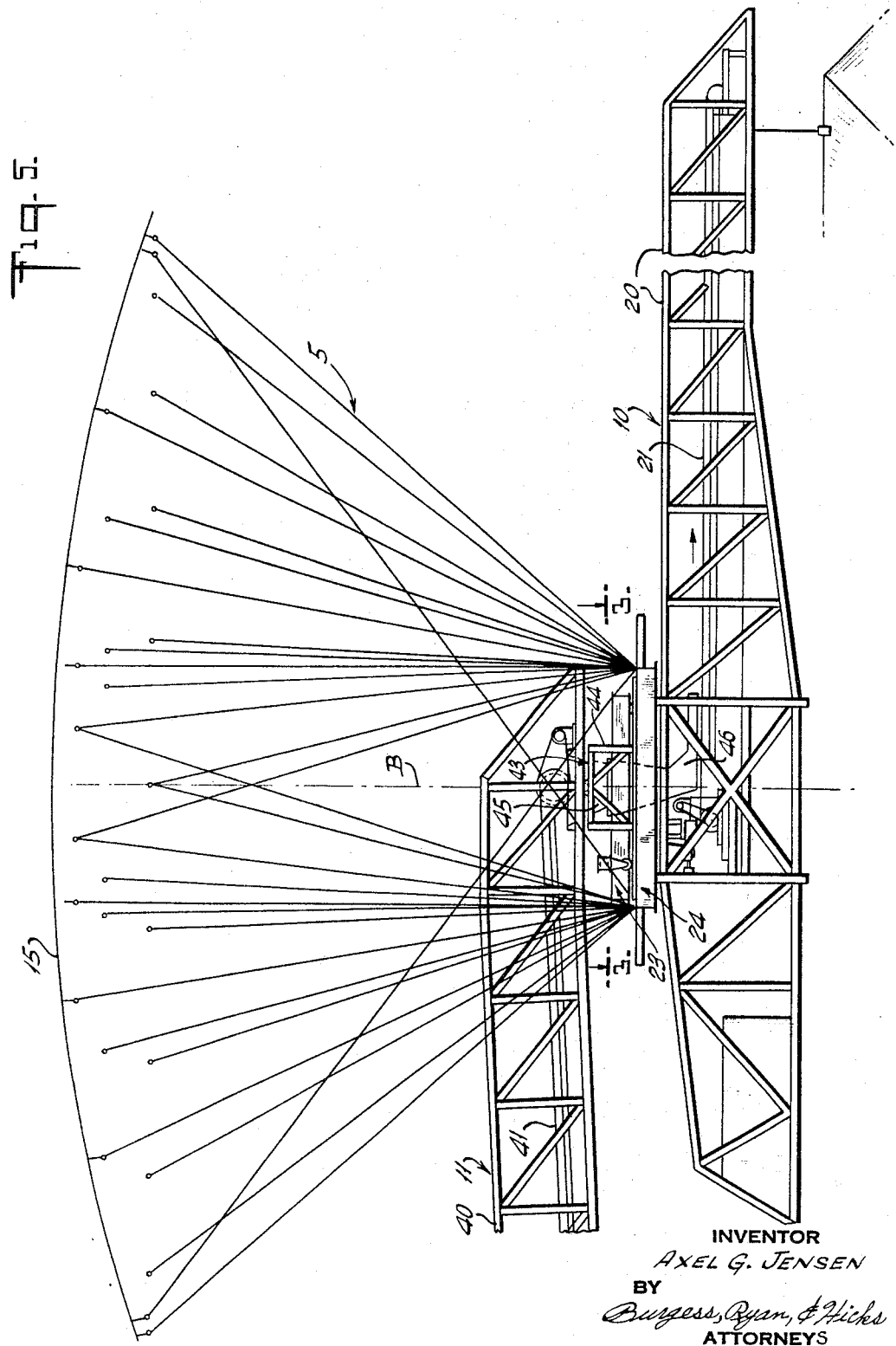

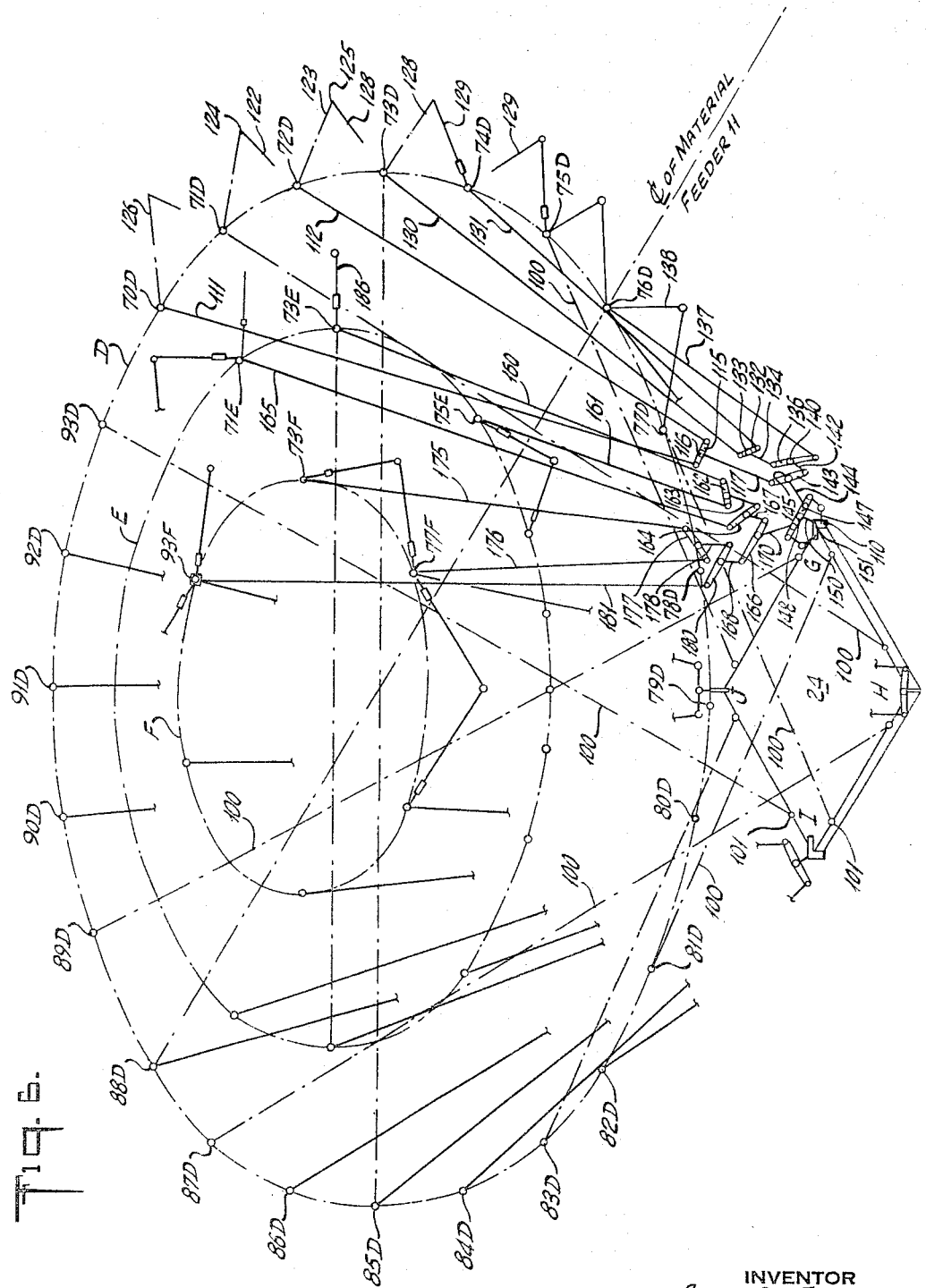

March 14, 1967  A. G. JENSEN  3,308,972
LOAD SUPPORTING SYSTEM
Filed Oct. 12, 1964  12 Sheets-Sheet 7
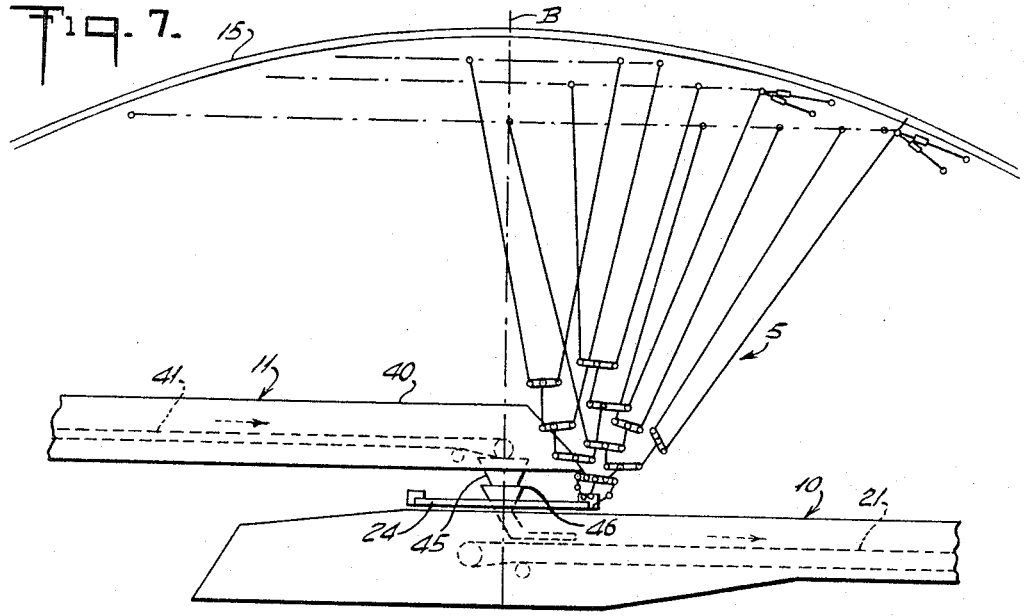
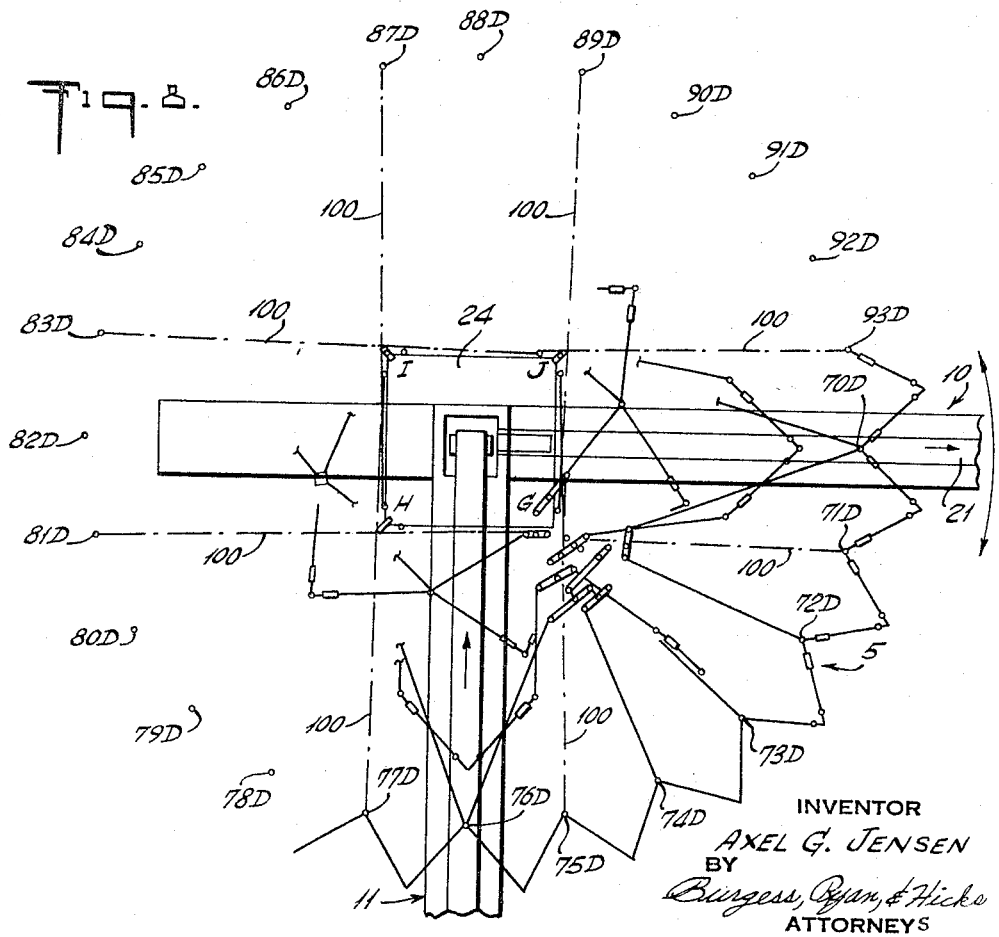
INVENTOR
AXEL G. JENSEN
BY
Burgess, Ryan, & Hicks
ATTORNEYS March 14, 1967  A. G. JENSEN  3,308,972
LOAD SUPPORTING SYSTEM
Filed Oct. 12, 1964  12 Sheets-Sheet 8
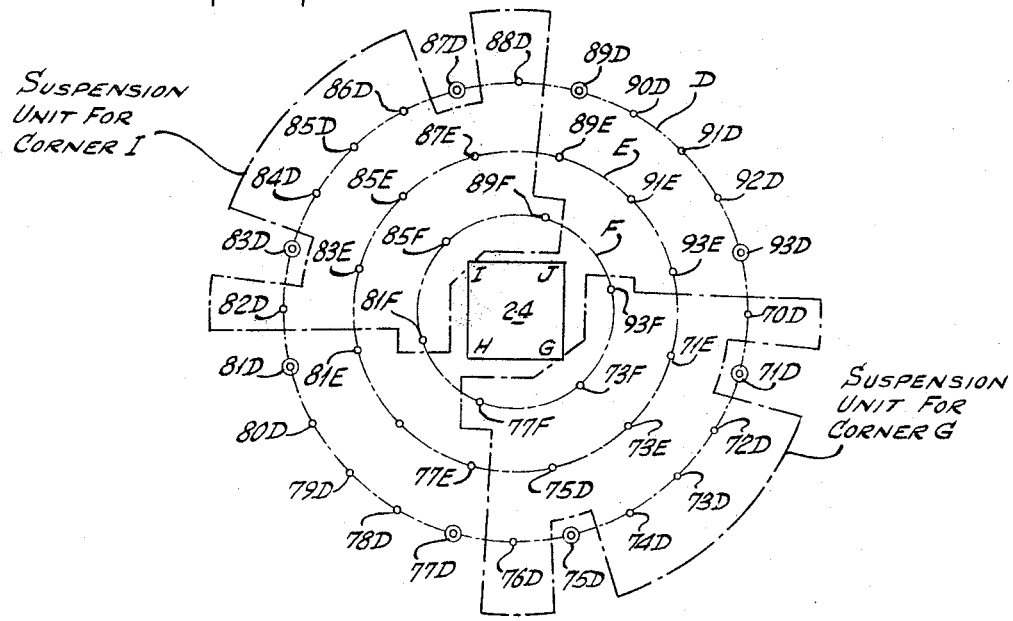
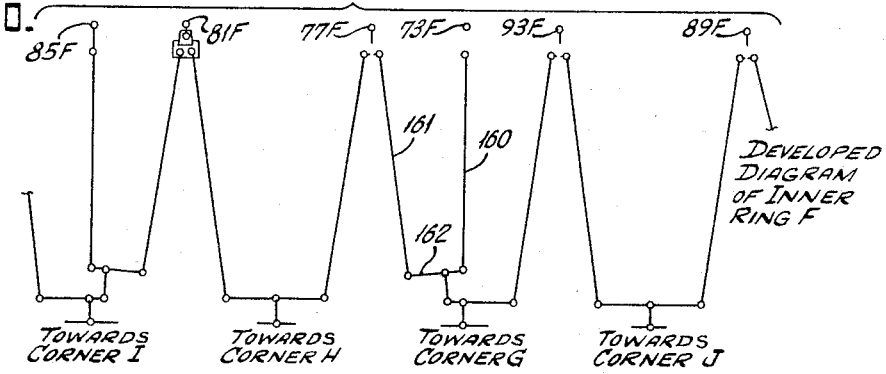
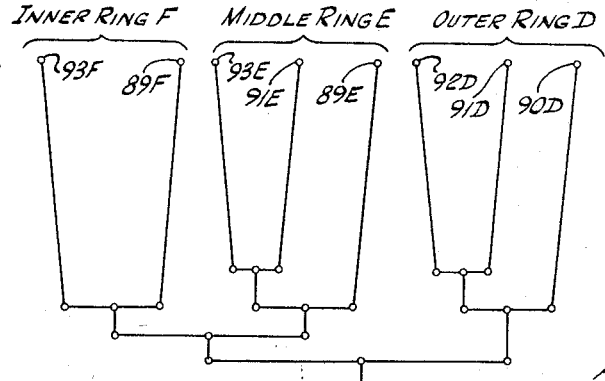
INVENTOR
AXEL G. JENSEN
BY
Burgess, Ryan, & Hicks
ATTORNEYS March 14, 1967  A. G. JENSEN  3,308,972
LOAD SUPPORTING SYSTEM
Filed Oct. 12, 1964  12 Sheets-Sheet 9

Fig.11a.

INVENTOR
AXEL G. JENSEN
BY
Burgess, Ryan, & Hicks
ATTORNEYS

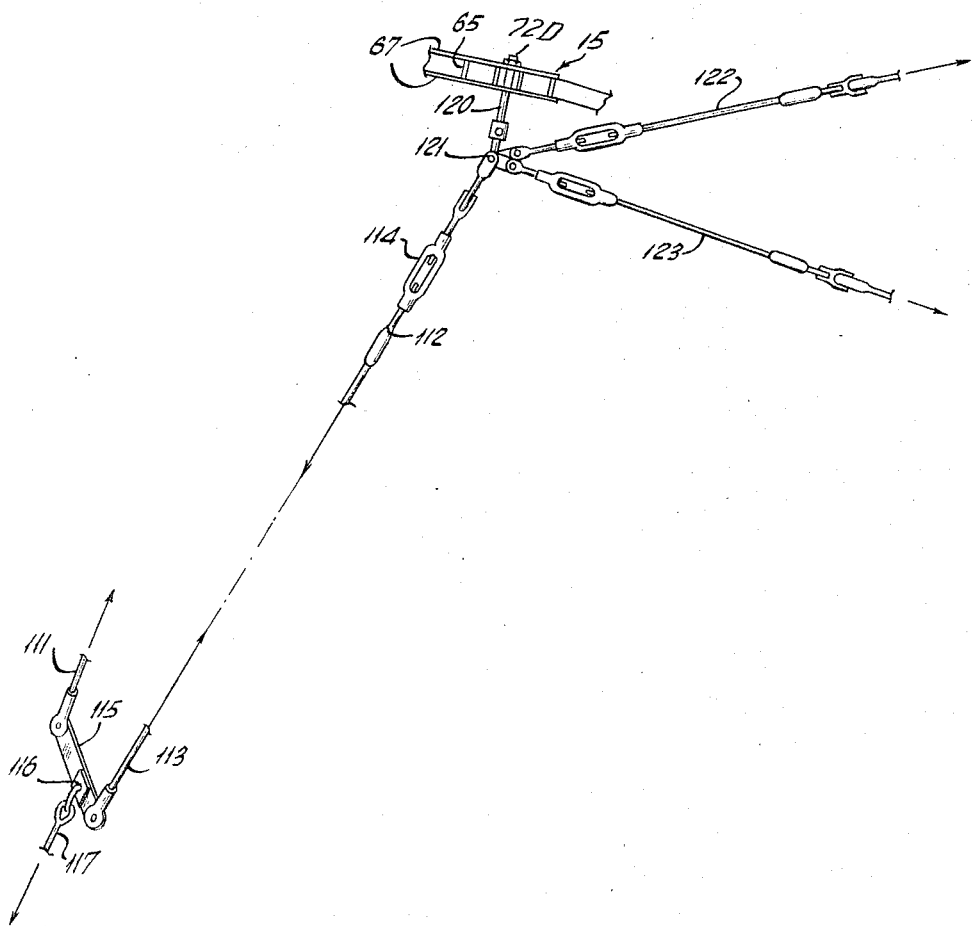

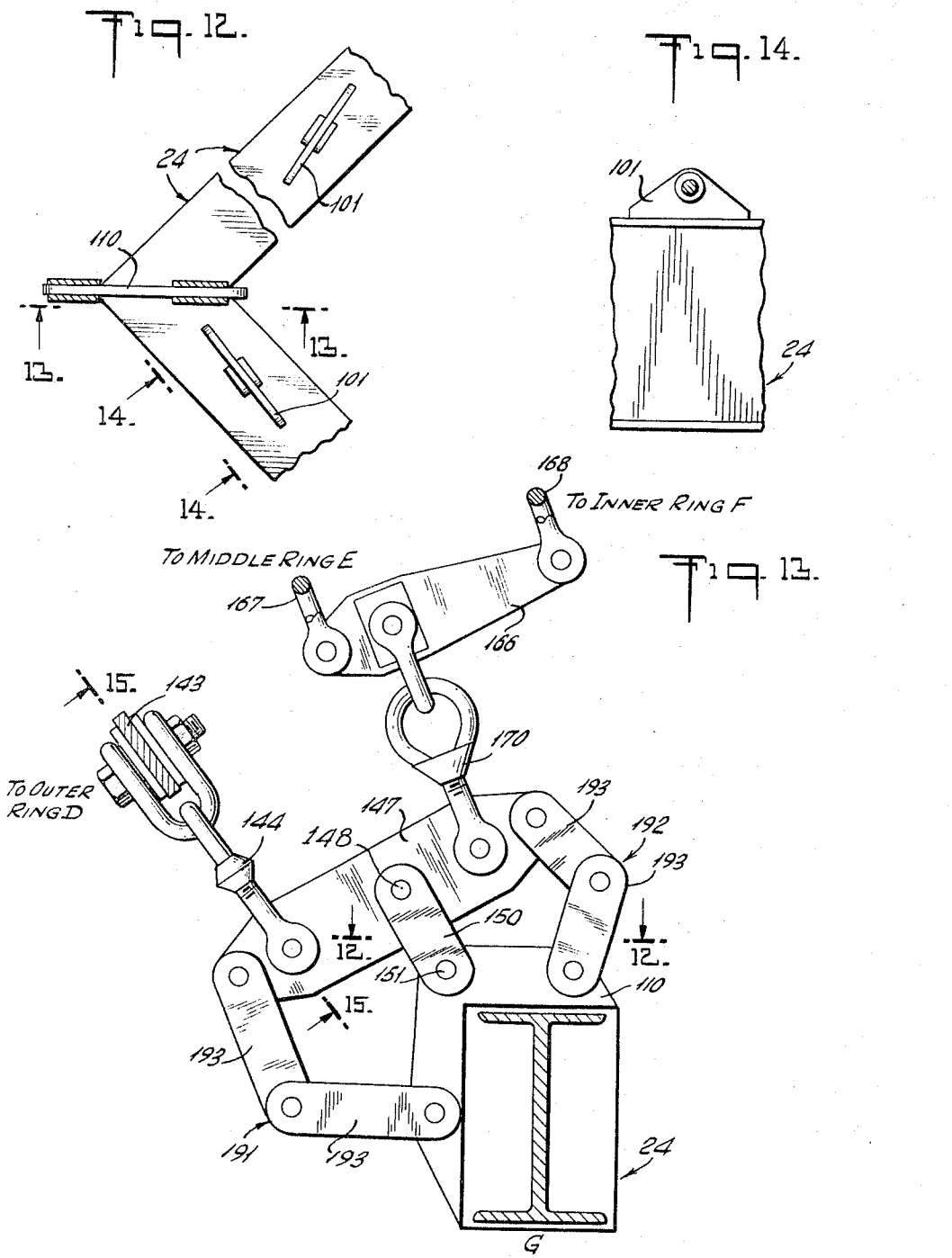

March 14, 1967 A. G. JENSEN 3,308,972
LOAD SUPPORTING SYSTEM
Filed Oct. 12, 1964 12 Sheets-Sheet 12
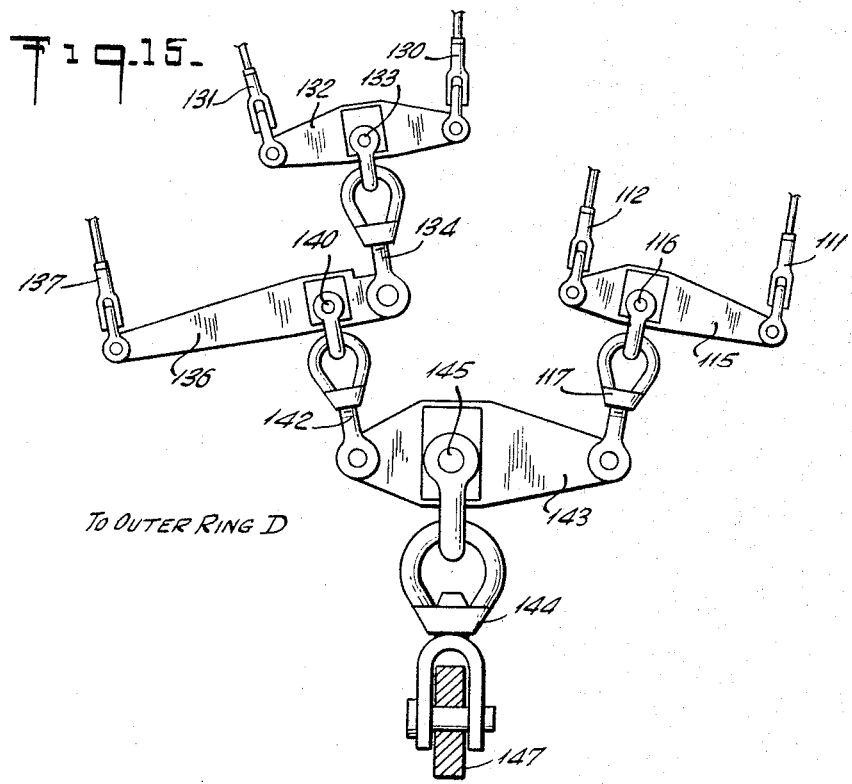
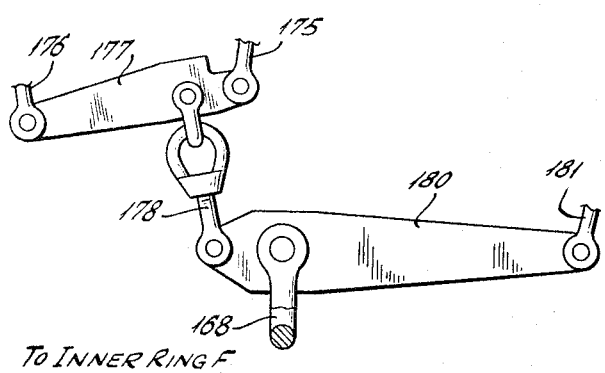
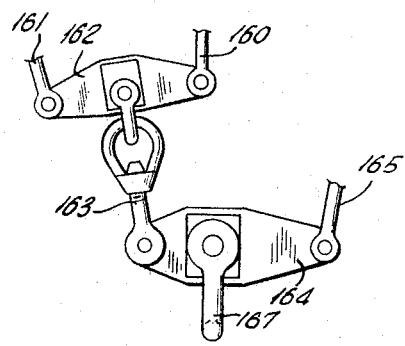
INVENTOR
AXEL G. JENSEN
BY
Burgess, Ryan, & Hicks
ATTORNEYS United States Patent Office 3,308,972
Patented Mar. 14, 1967

3,308,972
LOAD SUPPORTING SYSTEM
Axel G. Jensen, Little Falls, N.J., assignor, by mesne assignments, to Hewitt Robins, Stamford, Conn., a corporation of Delaware
Filed Oct. 12, 1964, Ser. No. 403,298
16 Claims. (Cl. 214—10)

The present invention relates to a load supporting system.

One object of the present invention is to provide a new and improved load supporting system, which is designed to yieldably support by suspension a movable operating unit and which can effectively sustain shocks resulting from the operation of said unit itself or from earthquakes.

Another object of the present invention is to provide a new and improved overhead suspension system for supporting an operating unit above the ground.

A further object of the present invention is to provide a new and improved load supporting system, which is designed to support by suspension an operating unit above the ground in a manner to permit the placement and operation of another operating unit directly below the suspended unit.

A further object of the present invention is to provide in conjunction with an operating assemblage within an enclosure, a new and improved system for supporting an operating unit of said assemblage from the roof of said enclosure.

Another object of the present invention is to provide a load suspension system of the improved type described, which is economical, light, easy to fabricate and install, and which is so constructed and so proportionally equalized as to effectively sustain the load, even in case of breakage of any of its load carrying components.

In accordance with certain features of the present invention, the load suspension system of the present invention is made up of a series of tension cables or tie rods, links and levers or beams, organized and correlated to carry yieldably the load from different parts of a supporting structure and to distribute the stresses therethrough in a manner to allocate the load to these different parts at substantially constant ratios regardless of variations in said load.

The present invention is particularly useful in conjunction with a material handling system such as those for handling bauxite, ores, coal and other loose materials, having a stacker for making a circular stock pile of material of predetermined form and a reclaimer for recovering the material progressively from said stack. In accordance with one aspect of the present invention, the material handling system comprises a stacker having a horizontal boom, and a conveyor extending therealong and is supported near one end above the ground for rotation about a vertical axis. The material to be stacked is delivered to the receiving end of the stacker conveyor near the central axis of the system, and is discharged from the other end of said conveyor and is deposited on the ground or floor. As the stacker rotates above the central axis of the material handling system, the material discharged on the ground thereform forms an annular or arcuate stack centralized about said axis and having a substantially triangular radial cross-section with its peak at the top.

The reclaimer is located below the level of the stacker and is supported horizontally for rotation about the central vertical axis of the material handling system. This reclaimer has a conveyor extending therealong, and one or more diggers or buckets movable therealong and adapted to remove the material from one end of the stack, to deposit it on this conveyor, while the stacker may be operating to accretively build up the stack at the other end. The recovered material is carried by the reclaimer conveyor to the center of the material handling system where it may be carried away by another conveyor radiating from said center to a point of delivery.

In a material handling system of the type described, an enclosure may be desirable to protect the material being handled from the weather, to prevent contamination of the atmosphere by dust, odors or fumes emanating from the material and for other reasons. In a radial material handling system of the general type described, a circular enclosure and especially a dome-shaped one, is desirable because of the economy in the cost of the building and in the cost of laying the foundation compared with a rectangular building, because of its stability against winds and storms, because such a structure presents a strong center support region for a load and for other reasons. The dome is desirably a self-supporting substantially spherical structure requiring no column, so that there are no structural obstructions, which would interfere with the support and continuous rotary operations of the stacker and the reclaimer in the same direction through recurrent cycles, and which would necessitate reversals of the operating units at the end of each of their cycle of rotation.

Another object of the present invention is to provide a material handing system of the rotary type described housed within an enclosure, and having the stacker so suspended and supported from the roof of the enclosure, as to permit the stacker and the reclaimer to rotate continuously and independently of each other about the center of the system in one direction through recurrent cycles without the need of reversal.

As a feature of the present invention, the stacker is supported from the central region of a dome enclosure by a load supporting system of the improved type described.

Various other objects, features and advantages of the present invention are apparent from the following description and from the accompanying drawings, in which:

FIG. 2 is a section of the dome-enclosed material handling system taken along the lines 2—2 of FIG. 1, and showing diagrammatically a cable-linkage suspension system for supporting the stacker from the center of the dome roof in accordance with an embodiment of the present invention;

FIG. 3 is a top plan view of the supporting platform for the stacker to which the stacker suspension system of the present invention is connected and of closely associated parts, and is taken approximately along the lines 3—3 of FIGS. 2, 4 and 5;

FIG. 4 is a vertical section of the supporting platform of the stacker to which the stacker suspension system of the present invention is connected and of closely associated parts, taken approximately along the lines 4—4 of FIG. 3;

FIG. 5 is an elevational detail view of the stacker and part of the means for feeding material to the stacker enclosed in a dome, and shows in connection therewith somewhat diagrammatically part of the cable-linkage suspension system of the present invention for supporting the stacker from the dome;

FIG. 6 shows somewhat diagrammatically in perspective part of the stacker suspension system embodying the present invention;

FIG. 7 shows in side elevation somewhat diagrammatically the suspension system for supporting one corner of the stacker platform from the dome, but showing the stacker in a position in relation to the material feeder different from that shown in FIG. 1;

FIG. 8 is a top plan view somewhat diagrammatically of the assemblage shown in FIG. 7, but showing the stacker in a different position in relation to the material feeder;

FIG. 9 is a key diagram showing diagrammatically in plan view the arrangements of the cable-linkage components of the stacker suspension system for the four corners of the stacker platform in relation to three concentric circular rings of anchor roof points on the dome, in accordance with an embodiment of the present invention;

FIG. 10 is a development of that part of the cable-linkage suspension system for the four corners of the stacker platforms associated with the innermost circular ring of anchorage points on the dome, in accordance with an embodiment of the present invention;

FIG. 11 is a development of that part of the cable-linkage suspension system for one corner of the stacker platform associated with the three concentric circular rings of anchorage points on the dome, in accordance with an embodiment of the present invention;

FIG. 11a is a top plan view showing the location of the anchor roof points on the three concentric circular rings on the dome and showing in connection therewith diagrammatically stress relieving structures to take up the non-radial stress components transmitted to these points by the load suspension system of the present invention;

FIG. 11b is a side elevation showing an upright tie rod forming part of the suspension system for one of the platfourm corners, and the lateral stress structure for taking up the non-radial components of the stress transmitted by said tie rod to an anchor roof point, so that the stress to said point is radial of the dome;

FIG. 12 is a top plan sectional view somewhat diagrammatic of a corner of the stacker platform taken on lines 12—12 of FIG. 13 and showing part of the cable-linkage suspension system associated with said corner, in accordance with an embodiment of the present invention;

FIG. 13 is an elevational sectional view of the cable-linkage suspension system associated with one corner of the stacker platform in accordance with one embodiment of the present invention, taken on lines 13—13 of FIG. 12;

FIG. 14 is a detail sectional view of a corner of the stacker platform taken on lines 14—14 of FIG. 12;

FIG. 15 is a section taken on lines 15—15 of FIG. 13 of the cable-linkage suspension system associated with one corner of the stacker platform and leading to the outer dome ring of anchor roof points in accordance with one embodiment of the present invention;

Figure 1:
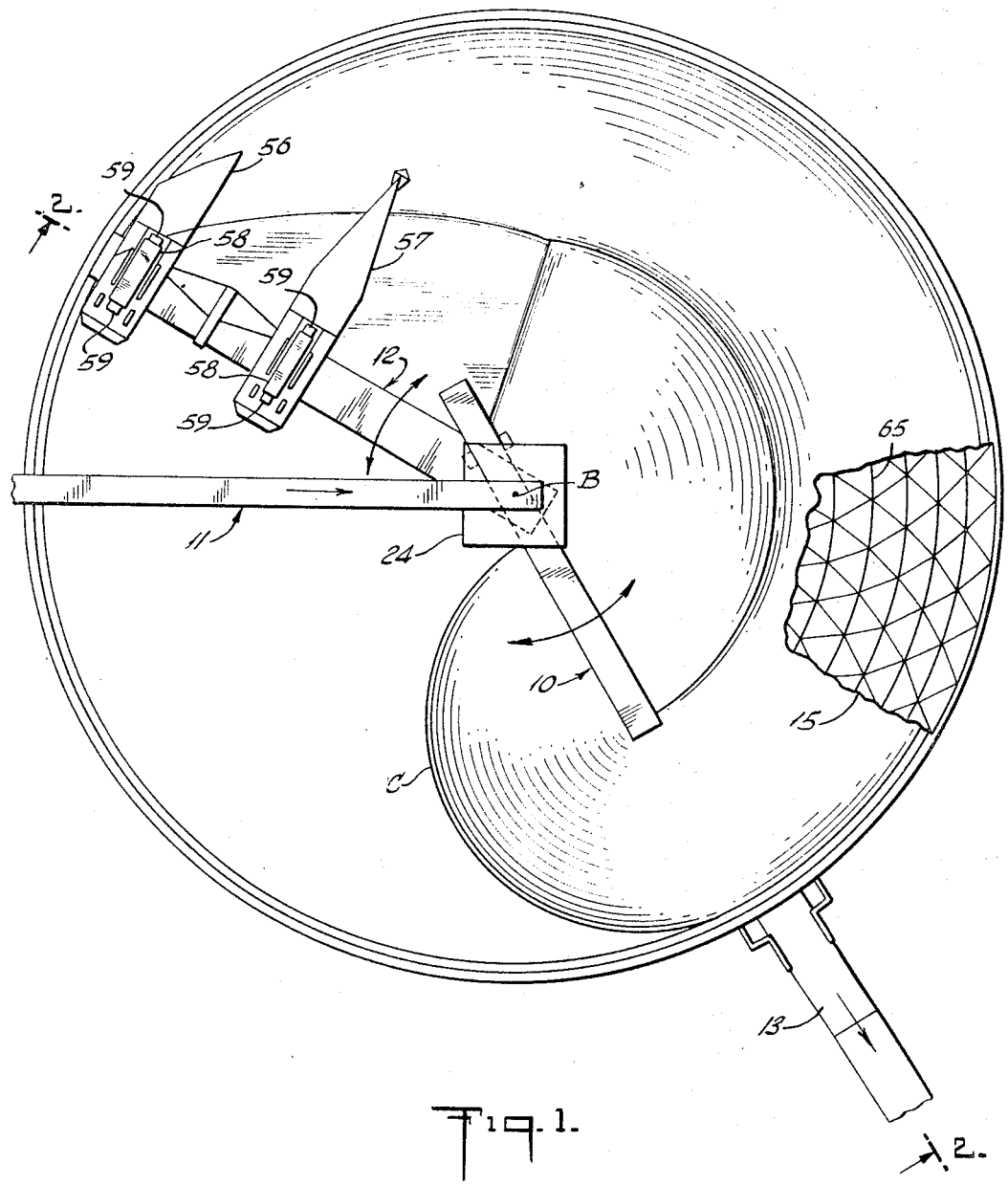
FIG. 1 is a top plan view somewhat diagrammatic of a material handling system of the rotary type described, which is shown with part of the dome enclosure broken away to show some of the operating parts of this system, and which can be employed in conjunction with a load supporting system of the present invention.

FIG. 16 is a side elevation of part of the cable-linkage suspension system, which is associated with one corner of the stacker platform leading to anchor roof points on the innermost dome ring and which constitutes one embodiment of the present invention; and FIG. 17 is a side elevation of part of the cable-linkage suspension system, which is associated with one corner of the stacker platform leading to anchor roof points on the middle dome ring and which constitutes one embodiment of the present invention.

Referring to FIGS. 1–5 of the drawings, the rotary material handling system to which the stacker suspension system of the present invention is particularly applicable comprises generally a horizontal stacker 10 suspended above the ground A for rotary movement about a vertical axis B by a suspension system 5 and adapted to store the material on the ground in the form of an arcuate or annular pile or stack C centered about said axis, a material feeder 11 for said stacker adapted to feed material to be stored from a region outside the ambit of the material handling system to the region of said stacker in said vertical axis B, a horizontal reclaimer 12 below the stacker supported for rotary movement about the center axis B, and adapted to recover material from the stored stack C and convey it towards a region of said center axis, and a horizontal conveyor 13 radiating from said center axis to carry material discharged from the reclaimer to a delivery region outside the ambit of the material handling system and located in an underground tunnel 14 radiating from said axis. An enclosure 15 in the form of a dome of circular horizontal cross-section concentric with the center axis B and desirably a geometric dome is provided to enclose the material handling system described, except that the material feeder 11 extends radially of the system and through the dome from the outside thereof. It is desirable to provide a metallic dome structure of the so-called geometric type, which consists of or has all its panel points lying on surfaces of revolution generated by some form of curvilinear element. The frame structure of the dome desirably consists of ribs or struts intersecting at mathematically determined centers on a spherical surface and forming a grid network of triangles distributing the stresses within the spherical structure itself. In the specific form shown, the dome 15 is a so-called lamellar dome characterized by only a few of the frame ribs running from the rim to the crown of the dome as meridonal spherical sector dividers, all other ribs running as intra-sector parallel lines, curvilinear or straight, to form a diamond grid, each diamond being subdivided into triangles.

Another possible dome that could be used is the so-called "geodesic" dome, such as that described in the Fuller U.S. Patent 2,682,235 having a building framework of generally spherical form in which the main structural elements are interconnected in a geodesic pattern of approximate great circle arcs intersecting to form a three-way grid defining triangles. Other possibilities of metallic dome structure systems are described in Paper 3358 of the ASCE Procedure, vol. 88, December 1962, pp. 201–26, by Shu-Tiem Li, entitled Metallic Dome-Structure Systems.

Also, as far as certain aspects of the invention are concerned, the enclosure 15 need not be of the geometric type but may be of any other type having any kind of a roof adapted to support a load by a suspension system of the general type described. For example, the roof structure may be parabolic or flat, or may be rigid or elastic.

The stacker 10 is shown comprising a horizontal overhanging truss or boom 20 substantially in the form of a cantilever bridge supporting a horizontal belt conveyor 21 extending from a material receiving point near the center axis B to a discharge point. The material discharged from the stacker conveyor 21 falls on the ground A and forms the pile or stack C and as the stacker 11 is moved about the center axis B, the stack is built up into annular form having a triangular cross-section with its apex on top in the cylindrical plane of the discharge end of said stacker conveyor.

The stacker boom 20 is rigidly secured to a turntable 23 supported for rotation about the center axis B on a comparatively fixed turntable support platform 24 to which the stacker suspension system 5 of the present invention for supporting the stacker 10 is connected in the manner to be described. This turntable support platform 24 has a center opening 25 with a circular I-beam 26 around it, to which a sprocket chain 27 is affixed to form therewith a fixed ring gear by which the turntable 23 can be rotated. The turntable 23 is supported above the platform 24 and on said platform for rotation about the center axis B and for that purpose, the circular beam 26 carries a circular rail 28 and the turntable has a frame structure 29 carrying wheels 30 on horizontal radial axes riding on top of said rail, and a frame srtucture 31 carrying wheels 32 on vertical axes riding along the inner periphery of said rail to center the turntable about the center axis B.

For driving the turntable 23 about the center axis B, there is a motor speed reducer unit 35 (FIG. 4) located below the fixed platform 24 and secured to the underside of the turntable for suspension therefrom. This motor unit 35 has a vertical output shaft 36 extending through the platform opening 25 and carrying a pinion 37 which meshes with the fixed ring gear 27. With this arrangement, as the motor unit 35 rotates, it is driven about the center axis B through the intermeshing gears 37 and 27, and this causes the turntable 23 to rotate about the center axis while the turntable support platform 24 remains fixed.

The material feeder 11 comprises a fixed truss 40, which may be in the form of a gallery, and which carries a feed belt conveyor 41 therealong. This truss 40 is supported outside the dome 15 on a fixed support 42, passes through an opening in the dome and is supported at its inner end inside the dome in the region of the center axis B on a frame 43 affixed to the turntable support platform 23. To secure the truss 40 to the platform 24, the frame structure of the platform has four columns 44 located outside the turntable 23, so as not to interfere with the rotation of said turntable and extending upwardly above the turntable to support the frame 43 to which the material feeder truss 40 is connected.

The feed conveyor 41 at its delivery end in the region of the center axis B discharges through a fixed chute 45 (FIGS. 5 and 7) secured to the fixed frame 43. This fixed chute 45 in turn discharges into a chute 46 coaxial with the center axis B and secured to the turntable 23 for rotation with said turntable about said axis. The lower end of the chute 46 is directly over the stacker conveyor 21 for discharge of the material onto said conveyor.

The details of the reclaimer 12, per se, are not part of the present invention. A suitable reclaimer 12 may comprise a bridge 50 extending radially from the center axis B and supported for rotary movement about said axis at its outer end on a fixed circular rail 51 concentric with the center axis. The bridge 50 carries at its outer end wheels 52 riding on the rail 51. The inner end of the reclaimer bridge 50 in the region of the center axis B, may be supported for rotary movement about said axis by means of a circular rail 53 concentric with said axis. The inner end of the reclaimer bridge 50 carries wheels 54 riding on the rail 53. The reclaimer 12 is motor driven in any well known manner.

A reclaimer belt conveyor 55 is supported on and extends along the reclaimer bridge 50 and a pair of harrows 56 and 57 supported on the bridge serve to rake and trim the end face of the stored stack C to facilitate the pick-up operation of diggers or buckets thereon to be described, and for that purpose, these harrows are independently movable angularly about a radial axis extending along the length of the bridge and are also independently movable along said radial axis.

The bridge 50 also supports carriages 58, which are rotatable about a radial axis extending along the length of the bridge and also movable along said axis. Each of these carriages 58 carries buckets or diggers 59 adapted to dig into the end face of the stack C as the carriages rotate to pick up material from said end face of said stack. As the filled buckets 59 rotate about the radial axis of the reclaimer 12, they drop the material onto the reclaimer conveyor 55 through respective chutes (not shown) carried by the reclaimer bridge 50.

The delivery end of the reclaimer conveyor 55 is near the region of the center axis B and discharges into a fixed chute 60 centrally aligned with said axis and depositing onto the tunnel conveyor 13 for delivery outside the dome enclosure 15.

The details of the components of the material handling system so far described, per se, aside from their connection with the suspension system 5 for supporting the stacker 10 to be described, forms no part of the present invention. Although the suspension system 5 to be described is particularly useful in connection with a stacker-reclaimer system of the rotary type described, as far as certain aspects of the invention are concerned, the suspension system may be employed in other fields where it is desirable to suspend a load above the ground.

The geometric dome 15 is a spherical skin structure having a triangulated truss frame 65 (FIGS. 1 and 11b) in the plane thereof, making the dome self-supporting without the use of columns or the like, except at its outer base periphery, as for example, the circular support 66 (FIG. 2). This dome 15 is shown covered with protective metal sheets 67, as for example, of aluminum, facing the frame structure 65, as shown in FIG. 11b, and its frame structure is elastic, so that it is subject to and capable of withstanding deflection due, for example, to temperature variations, variable live loads, wind pressures and the like. These variations in dome deflection as well as those due to expansion or contraction of the cables forming components of the suspension system of the present invention are proportionally equalized through this system in the manner to be made apparent.

The suspension system 5 of the present invention is shown in FIGS. 6-11a supported (1) from equally spaced anchor points 70D, 71D, 72D . . . 93D, twenty-four being shown of this series, arranged in a circular chordal ring or row D on the roof of the dome 15, concentric with the center axis B of the material handling system, (2) from equally spaced anchor points 71E, 73E, 75E . . . 93E, twelve being shown of this series, arranged in a circular chordal ring or row E on the roof of the dome inside the ring D and concentric therewith, and (3) from equally spaced anchor points 73F, 77F, 81F, 85F, 89F and 93F, six being shown of this series, arranged in a circular chord ring or row F on the roof of the dome inside the ring E and concentric therewith. The relationship of the loads carried by the individual anchor points in the three rings D, E and F may be predetermined approximately by the design of the dome 15, and may, for example, be at a ratio of 66⅔:100:75 per median load point.

Out of the twenty-four anchor points on the outer ring D, eight of these anchor points are reserved for eight guy cables or wire ropes 100 employed for the purpose of stabilizing the turntable support platform 24 against horizontal edgewise movement. For that purpose, there are provided near each corner of the platform 24 two brackets 101 on opposite sides of the corner, having holes for the attachment of the stabilizing guy ropes 100 thereto respectively through shackles or swivel connections (not shown). These eight stabilizing guy ropes 100 are arranged in four pairs, each pair of guy ropes extending obliquely downwardly in substantial parallelism from a pair of anchor roof points on the outer ring D of the dome 15 to the two brackets 101 respectively located on opposite sides of the platform nearest to that side of the platform between said opposite sides furthest from said pair of roof anchor points respectively. The anchor roof points for the stabilizing guy ropes 100 on the outside ring D are set up in pairs quadrantly arranged, so that two pairs are located on the outer ring D opposite each other along a diametrical line, and two pairs are located on the outer ring D opposite each other along a diametrical line at right angles to said first mentioned diametrical line. As a result, the eight stabilizing guy ropes will appear in plan view as four pairs of guy ropes radiating from the far sides of the platform 24 in generally rectangular cruciated form, as shown in FIG. 8.

In the specific form of the invention shown, the four pairs of anchor roof points on the outer ring D utilized for the stabilizing guy ropes 100 are the pair 93D and 71D, the pair 75D and 77D, the pair 81D and 83D and the pair 87D and 89D. The other sixteen anchor roof points on the outer ring D are utilized as the equalizing load carrying anchor points for the stacker suspension system.

Each of the stabilizing guy ropes 100 desirably contains along its length a turnbuckle similar to those in the tie rods or ropes of the equalizing parts of the suspension system 5 to be described, to adjust the effective length of and to prestress these guy ropes. With the platform stabilizing system described, movement of the platform in any direction edgewise is resisted but not so rigidly as to interfere with the proportional equalizing features of the suspension system or with support of the stacker 10 in a way to resist shocks.

In some of the figures, the turntable support platform 24 is shown somewhat diagrammatically as a flat square plate without the turntable to facilitate representation of the suspension system 5 shown in connection therewith. This platform 24 is shown with its four corners marked G, H, I and J, and in FIGS. 6, 7 and 8, the equalizing components in connection with the corner G of the platform are especially shown.

The load to be sustained at each corner G, H, and I and J of the platform 24 due to the weight of the stacker 10 and pieces of apparatus associated therewith would vary according to the angular position of the stacker in relation to the central axis B, and this load is distributed through the components of the suspension system 5 to the various roof anchor points on the three rings D, E and F of the dome 15 in such a way that each component will carry its predetermined proportionate part of the load regardless of such variations. Also, any changes in the load due to deflections of the dome 15 will not change to any substantial extent the proportions of the load carried by the components of the system.

There is secured to the four corners G, H, I and J of the platform 24 brackets 110 to which the lower ends of four suspension units are anchored respectively, the upper ends of each of these suspension units being secured to roof anchor points on the three rings D, E and F of the dome 15. FIGS. 6, 7 and 8 show one of these suspension units in connection with the corner D of the platform 24. As shown, each suspension unit comprises an assembly of whipple-trees multi-ply oordinated to effect the desired proportional stress division and distribution described. The make-up of this assembly and the leverage afforded by the walking beams or trees thereof are determined by the desired proportions of the total load at the corresponding corner of the platform 24 to be distributed to the roof anchor points on the rings D, E and F of the dome 15 to which this load is transmitted.

The suspension unit for the corner G of the platform 24 in the specific embodiment shown in FIGS. 6-16 comprises tie rods 111 and 112, each of which contains a flexible tension cable or wire rope 113 and a turnbuckle 114 (FIG. 11b) by which the length of the tie rod can be adjusted and the tie rod prestressed. The upper ends of these tie rods 111 and 112 are connected through vectorial tension relief means to be described to anchor points 70D and 72D respectively on the outside chordal ring D of the dome 15 and their lower ends are pivotally connected to the opposite ends of a tree 115 in the form of a lever or beam. Pivotally connected to the beam 115 at 116 intermediate its ends is the upper end of a tension link 117 to which a predetermined portion of the load from the corner G of the turntable support platform 24 is transmitted by means to be described. The load on the link 117 is equal almost to the total of the stresses on the tie rods 111 and 112, the deviation therefrom depending on the angle between these tie rods, and the proportions of the total load on this link assumed by the tie rods depending on the location of the pivot point 116. In a specific form, for example, assuming that there is transmitted 8,880 pounds of stress to the link 117 from the total load on the corner G of the turntable support platform 24, and assuming that the pivot point 116 is located 12 inches from the tie rod 111 and 6 inches from the tie rod 112, the stress transmitted to the tie rod 111 will be about 2,960 pounds and the stress transmitted to the tie rod 112 will be about 5,920 pounds.

The tie rods 111 and 112 do not extend radially with respect to the dome 15 and if the stresses were transmitted directly to the anchor points 70D and 72D respectively on the dome 15, the dome would be stressed at these points in an objectionable non-radial direction. Due to the pattern of the dome structure 15, it is desirable to apply lateral stresses of the tie rods 111 and 112 by vectorial tension relief means connected to the upper ends of said tie rods and to points on the dome 15 spaced from the anchor points 70D and 72D, so that the resultant stresses transmitted to the roof anchor points 70D and 72D are in directions only radially of the dome 15. In the specific form shown in FIG. 11b, the vectorial tension relief means for the anchor point 72D acts on a roof bolt 120, which extends radially from the roof to the meeting point of triangulated framed rods within the dome 15 at this anchor point, and which is connected at its lower end at 121 to the upper end of the tie rod 112, and comprises two lateral tie rods 122 and 123 (FIGS. 6 and 11b) converging towards and meeting at 121 and connected at their meeting ends together and to the end of tie rod 112. The other ends of the lateral tie rods 122 and 123 are connected directly to structural roof points 124 and 125 respectively located on the dome 15 outside of the chordal ring D of the dome in the regions near where triangulated frame rods in the dome meet. These lateral tie rods 122 and 123 are almost parallel to the roof structure, and the stresses transmitted to the structural roof points 124 and 125, therefore, are mostly compression stresses in the roof struts, which can be tolerated on the dome 15 without creating structural problems. For example, in the specific embodiment illustrated, with the tie rod 112 laterally biased as described, the tie rod 122 will be stressed 1,350 pounds and the tie rod 123 will be stressed 850 pounds, and these will be enough to cause the resultant stress to be transmitted to the radial roof bolt in a radial direction. The radial roof bolt 120 will, therefore, be free of bending moments.

The vectorial tension relief tie rods 122 and 123 may each comprise a rod and a turnbuckle. Similar vectorial tension relief means 126 may be employed for the anchor roof point 70D.

The suspension unit for the corner G of the turntable support 24 also includes tie rods 130 and 131, which are connected at their upper ends through radial roof bolts to roof anchor points 73D and 74D respectively on the outside ring D of the dome 15, and which are laterally biased by vectorial tension relief means 128, 128 and 129, 129 similar to the vectorial tension relief means 122, 123 to direct the resultant stress transmitted by said tie rods 130 and 131 radially of the dome roof. The lower ends of these tie rods 130 and 131 are pivotally connected to the opposite ends respectively of a beam 132 and pivotally connected to an intermediate section of this beam at 133 is a link 134 through which part of the load on corner G of the platform 24 is transmitted to the beam. The location of the pivot point 133 on the beam 132 depends on the proportions of the stress from the link 134 to be transmitted to the tie rods 130 and 131 and in turn to the radial roof bolts at the anchor roof points 73D and 74D.

For transmitting a proportionate amount of the load at the corner G of the platform 24 to the link 134, the lower end of this link is pivotally connected to one end of a beam 136, the other end being pivotally connected to the lower end of a tie rod 137, which is connected at its upper end to the anchor roof point 76D through a radial roof bolt, and which is laterally biased by vectorial tension relief means 138, 138 for the purpose already made apparent. Intermediate the ends of this beam 136 at 140 is pivotally connected the upper end of a link 142, the lower end being pivotally connected to one end of a beam 143. The lower end of the link 117 is pivotally connected to the other end of this beam 143, and a link 144 pivotally connected at its upper end to the beam 143 intermediate its ends at 145, transmits a predetermined proportion of the load from corner G of the platform 24 through the components 143, 142, 136, 134, 137, 132, 130, 131, 117, 115, 111 and 112 of the whipple-tree system to the radial roof points 70D, 72D, 73D, 74D and 76D. The lower end of this link 144 is pivotally connected to a beam 147 near one end constituting the main or lead beam for three whipple-tree series, leading to three series of anchor roof points on the dome rings D, E and F respectively. One of these whipple-tree series associated with the anchor roof points 70D, 72D, 73D, 74D and 76D on the outside ring D of the dome 15 and emanating from one end of the lead beam 147 has been described, while the other two whipple-tree series associated with anchor roof points on the other two dome rings E and F respectively and emanating from the other end of the beam 147 will be described hereinafter.

The intermediate section of the lead beam 147 is pivotally connected at 148 to one end of a link 150, the other end being pivotally connected at 151 to the bracket 110.

As made apparent with respect to the location of the intermediate pivot points 116 and 133, on the beams 115 and 132 respectively, the intermediate pivot points 140, 145 and 148 on the beams 136, 143 and 147 respectively, are located in relation to the ends of the latter beams to allocate predetermined proportions of the stresses applied to these intermediate points to the ends of the latter beams.

The whipple-tree series associated with anchor roof points on the middle dome ring E comprises two tension tie rods 160 and 161, connected at their upper ends to radial roof bolts at anchor roof points 73E and 75E respectively on said dome ring and pivotally connected at their lower ends to opposite ends of a beam 162. Pivotally connected to the intermediate section of the beam 162 is the upper end of a link 163, the lower end being pivotally connected to one end of a beam 164. The other end of the beam 164 is connected to a radial roof bolt at anchor roof point 71E on the dome ring E by means of a tie rod 165. The intermediate section of the beam 164 is pivotally connected to one end of a beam 166 by means of a link 167. The other end of this beam 166 is pivotally connected by a link 168 to a whipple-tree series associated with anchor roof points on the inside ring F, and the intermediate section of this beam 166 is pivotally connected by a link 170 to the lead beam 147 near one end opposite the end connected to the link 144 associated with the whipple-tree series acting on the anchor roof points 70D, 72D, 73D, 74D and 76D of the outside dome ring D.

The whipple-tree series emanating from the lead beam 147 and acting on the anchor roof points of the inside dome ring F comprises two tension tie rods 175 and 176 connected at their upper ends to radial roof bolts at anchor roof points 73F and 77F respectively on this inside ring and pivotally connected at their lower ends to opposite ends respectively of a beam 177. The intermediate section of the beam 177 is pivotally connected to a link 178 also connected to one end of a beam 180, the other end being connected to a radial roof bolt at anchor roof point 93F on the inside dome ring F by means of a tension tie rod 181. The intermediate section of the beam 180 is connected to one end of the beam 166 by means of the link 168.

The intermediate sections of the beams 162, 164, 166, 177 and 180 to which the links 163, 167, 170, 178 and 168 are pivotally connected respectively, are located along these beams in position to allocate predetermined proportions of the stress transmitted to these intermediate beam sections to the ends thereof to transmit predetermined proportions of load at the corner G of the platform 24 to the different tie rods 160, 161, 165, 175 and 176 and in turn to the anchor roof points 73E, 75E, 71E, 73F and 77F respectively.

The platform stabilizing guy ropes 100 are biased by stress relief tie rods extending laterally of the ropes similar to the lateral tie rods 122 and 123, to take up the non-radial components of the stresses transmitted by these guy ropes to radial roof bolts.

The lateral biasing means, which act on the upright tie rods in the whipple-tree system and on the stabilizing guy ropes 100 for all of the radial roof bolts on the outside roof ring D, to take up the non-radial components of the stresses transmitted to these roof bolts, and which are represented by the lateral tie rods 122, 123, 128, 129, 138 and by other lateral tie rods not specifically described but shown, are arranged as shown in FIG. 11a substantially in the form of an equilateral or symmetrical star around the entire periphery of the outer ring with each upright tie rod and each upright guy rope laterally biased by two biasing tie rods diverging therefrom, and with the two lateral tie rods connected to each pair of adjacent upright members converging towards a point on a ring K outside the roof ring D and concentric therewith. Actually, those converging lateral tie rods are not connected to the frame structure of the dome 15 on the ring K where they meet, if extended, but are connected at points just inside this ring K, as shown in FIG. 11a.

In connection with the radial roof bolts at the anchor roof points on the intermediate or middle roof ring E, some of the upright tie rods of the whipple-tree system associated with some of these anchor roof bolts, as for example, the tie rods 160 (FIG. 6), lie substantially in a plane radial of the dome 15, extending through the center of the dome and through a corner of the platform 24. In that case, the lateral biasing means for such an upright tie rod in such a radial plane does not need two lateral diverging tie rods to take up the non-radial component of the stress transmitted by said radial tie rod, but a single lateral tie rod in the radial plane, such as the lateral tie rod 186, is sufficient. In the specific form shown, there are four such single lateral biasing tie rods quadrantly arranged and acting on the four upright tie rods of the whipple-tree system extending in radial planes of the dome 15 respectively passing through the four corners G, H, I and J respectively of the platform 24 and connected to the anchor dome points 73E, 79E, 85E and 91E on the middle ring E. The other radial roof bolts at the anchor roof points of the intermediate dome ring E are acted upon by lateral biasing tie rods arranged substantially in the form of star segments, except that these lateral tie rods, although converging outwardly towards radiating points in a circle coextensive with the outer ring D, are actually connected to the frame structure of the dome 15 just inside of this ring.

In the case of the radial roof bolts at the anchor roof points on the inside roof ring F, the upright tie rods of the whipple-tree system extending from the two anchor roof points 73F and 85F to the corners G and I respectively are actually radially of the dome 15, so that no lateral biasing means are necessary therefor. In the case of the other anchor points 77F, 81F, 89F and 93F, these are biased by lateral tie rods 187 arranged as segments of a star, except that these tie rods, although converging in pairs towards a circle coextensive with the middle ring E, are actually secured to the frame structure of the dome 15 just short thereof.

Each of the lateral tie rods for taking up the non-radial components of the stresses transmitted to the radial roof bolts by the upright tie rods of the whipple-tree suspension system and by the stabilizing guy ropes 100 desirably comprises a tension rod and a turnbuckle to permit these lateral tie rods to be adjusted in length and to be prestressed.

FIG. 13 shows part of the whipple-tree suspension system near the corner G of the turntable support platform 24. The lead or main beam 147 is shown connected to a part of the corner bracket 110 at 151 by means of the lead link 150 and this link transmits the full load at the platform corner G to the intermediate section of this beam. To assure against collapse of the suspension system in case the lead link 150 should break, there are two linkages 191 and 192 connected to opposite ends of the beam 147 and to the bracket 110 on opposite sides of the bracket connection to the link 150. Each of these linkages 191 and 192 consists of a pair of pivotally joined links 193, one of which is pivotally connected to the beam 147 and the other to the bracket 110. Upon breakage of the link 150, the load at the corner G of the platform 24 is transmitted to the lead beam 147 through the linkages 191 and 192. While the link 150 is effective, the linkages 191 and 192 are idle.

The lead beam associated with each of the other corners H, I, and J of the platform in the whipple-tree suspension system is similarly connected to the bracket in its respective corner by a main center link and safety flanking linkages.

It should be noted from FIGS. 13, 15, 16 and 17 that the links in the whipple suspension system interconnecting the trees or beams in this system are made up of swivels and shackles, to permit free swivel and pivotal movements of the different components of this system.

FIG. 13 illustrates the lower section of the whipple-tree suspension system conected to the corner G of the turntable support platform 24 and shows on its load output side its beam 143 forming part of the whipple-tree series leading to the anchor roof bolts on the outside dome ring D, and shows also on its load output side, link 167 connected to one end of beam 166 forming a base part of the whipple-tree series leading to the anchor roof bolts on the middle dome ring E and link 16 connected to the other end of said beam 166 forming a base part of the whipple-tree series leading to the anchor roof bolts on the inner dome ring F. FIG. 15 shows the whipple-tree series beyond the lead beam 147 of FIG. 13, leading to the anchor roof bolts in the outer dome ring D, FIG. 16 shows the whipple-tree series beyond the link 168 of FIG. 13, leading to the anchor roof bolts in the inner dome ring F and FIG. 17 shows the whipple-tree series beyond the link 167 of FIG. 13 leading to the anchor roof bolts in the middle or intermediate dome ring E.

The whipple-tree suspension unit shown and described has been for the corner G of the turntable support platform 24. Due to the pattern of loading on the platform 24, the opposite corner I of the platform would have a similar whipple-tree suspension unit in an embodiment of the invention such as is shown here. The whipple-tree suspension units for the two opposite corners H and J would be similar to each other but would be slightly different from the suspension units for the corners G and I, according to the pattern of loading in the embodiment of the invention illustrated here, as shown in FIG. 9. The arrangement of the different whipple-tree units for the different platform corners would depend on the number of anchor roof points available in the different dome rings D, E and F. In the specific embodiment of the invention illustrated here, there are twenty-four equally spaced anchor roof points in the outside dome ring D, eight of these being reserved for the stabilizing guy ropes 100, so that only sixteen are available for the four suspension units connected to the four corners G, H, I and J of the platform 24. In the specific form shown, five of these anchor roof points on the outside dome ring D, namely points 70D, 72D, 73D, 74D and 76D are utilized for the whipple-tree suspension unit for the corner G of the platform 24, and five of these points, namely points 82D, 84D, 85D, 86D and 88D are utilized for the whipple-tree suspension unit for the opposite corner I of the platform 24. That leaves three anchor roof points on the outside dome ring D for the whipple-tree suspension unit for the platform corner H, namely points 78D, 79D and 80D, and three anchor roof points on the outside dome ring D for the whipple-tree suspension unit associated with the platform corner J, namely points 90D, 91D and 92D.

The anchor roof points on the outside dome ring D, not employed as part of the whipple-tree suspension systems, but for the stabilizing guy ropes are the points 71D, 75D, 77D, 81D, 83D, 87D, 89D and 93D.

The general whipple-tree suspension units that can be employed for the platform corner J as well as corner I is shown somewhat diagrammatically in FIG. 11, and it is seen therefrom and from the diagram of FIG. 9, that the unit for the platform corner H employs only anchor points 78D, 79D and 80D on the outside dome ring D and the unit for the platform corner I employs only points 90D, 91D and 92D on said outside dome ring.

The middle dome ring E contains twelve equally spaced anchor points, the whipple-tree unit for each platform corner utilizing three of these points, as shown in FIGS. 9 and 11. There are no anchor roof points for any stabilizing guy ropes in this middle ring E.

The inner dome ring F contains six equally spaced anchor points. In the whipple-tree unit for each of the platform corners G and I, one of the anchor roof points on the inner dome ring F is employed singly for one suspension unit, while two other points on said ring flanking the point singly employed are shared by the suspension units for the platform corners H and I, as shown in FIGS. 9 and 10. For example, while the anchor roof point 73F on the inner dome ring F is employed for the single upright tie rod 160 extending to the beam 162 in the whipple-tree suspension unit for the platform corner G, the two other anchor roof points 77F and 93F on said inner ring flanking said anchor roof point 73F are shared between upright tie rods form said suspension unit and upright tie rods from the whipple-tree suspension units for the platform corners H and I respectively, as shown in FIG. 10. Similarly, anchor roof point 85F in the inner ring F for the whipple-tree suspension unit for the platform corner I is employed for a single upright tie rod in said unit, while the anchor roof points 81F and 89F in said inner ring are shared with the whipple-tree suspension units for the adjoining platform corners H and J, as shown in FIGS. 9 and 10.

The whipple-tree suspension unit for each platform corner is in effect a proportional stress divider system in which the load from the corner is proportionally divided, subdivided and distributed according to the leverage arms afforded by the different beams or trees for proportional distribution to the anchor roof points in the three dome rings D, E and F. Any variations in the loads at the platform corners G, H, I and J due to changes in the angular position of the stacker 10 in relation to the center axis B or to deflections of the dome 15 will cause variations in the loads at these corners, but the proportions of these loads transmitted to the different components of the suspension unit for each platform corner will remain proportionally constant.

Also, it is apparent that the suspension system for the stacker 10 is flexible enough to withstand effectively shocks. This is particularly important in areas subject to earthquakes.

The suspension system of the present invention is also safe, because breakage in any component of the system will not result in the collapse of the system.

The stacker 10 supported as described from the center of the dome 15 can rotate continuously in one direction about the center axis B through recurrent circuits without interfering with the operation of the reclaimer 12, which can also rotate in the same direction continuously in one direction about the center axis B through recurrent circuits.

While the invention has been described with particular reference to a specific embodiment, it is to be understood that it is not to be limited thereto but is to be construed broadly and restricted solely by the scope of the appended claims.

What is claimed is:

1. In combination, an operational mechanism having a part rotatable about an upright axis and a fixed structure from which said rotatable part is supported defining a plurality of suspension points spaced around said axis, the load from said rotatable part on said fixed structure varying according to the rotary position of said rotary part, an enclosure for said operational mechanism having a self-supporting circular dome roof centered with respect to said axis, and defining a plurality of anchor roof points arranged in concentric circular rows about said axis, and a system for suspending said operational mechanism from said dome roof comprising a plurality of suspension units, each extending from a corresponding suspension point on said fixed structure to a plurality of said anchor roof points on the different rows and having means for dividing and distributing the stresses transmitted from the latter suspension point on said fixed structure to the latter anchor roof points to allocate predetermined proportional amounts of the load from the latter suspension point to the latter anchor roof points regardless of variations in said load.

2. The combination as described in claim 1, wherein said operational mechanism is a stacker having an overhanging boom and a conveyor extending therealong.

3. The combination as described in claim 1, wherein said enclosure is a geometric dome.

4. The combination as described in claim 1, wherein each of said suspension units comprises a plurality of whipple-trees.

5. In combination, a stacker comprising a boom, a stationary platform, a turntable supported on said platform for rotation about a vertical axis, said boom being affixed to said turntable for rotation about said vertical axis, and a conveyor on said boom extending therealong, an enclosure for said stacker having a self-supporting circular dome roof centered with respect to said axis and defining a plurality of spaced anchor roof points, and a system for suspending said stacker from said dome roof comprising a plurality of stabilizing guy ropes extending from said dome roof to said platform supporting said platform against sideway movements, and means for dividing and distributing the stresses transmitted from a plurality of support points on said platform to said anchor roof points to allocate predetermined proportional amounts of the loads at said platform points respectively transmitted to said anchor roof points regardless of variations in said loads.

6. The combination as described in claim 5, wherein eight of said stabilizing guy ropes are provided in four quadrantly arranged pairs, each pair of guy ropes extending obliquely downwardly from a pair of spaced points on said dome to two points on said platform.

7. The combination as described in claim 5, wherein said stress dividing and distributing means comprises whipple-tree assemblies.

8. The combination as described in claim 5, said anchor roof points being arranged in three concentric rows centered about said axis, said platform having four points of support spaced about said axis, said stress dividing and distributing means comprising a whipple-tree assembly extending from each of said support points to a number of said anchor roof points on the three rows.

9. In combination, a mechanism having a stationary structure from which the mechanism is supported and to which the load from the mechanism is transmitted, an enclosure for said mechanism having a roof in the form of a self-supporting spherical dome having the property of sustaining those stresses which are lateral thereto most effectively when in a radial direction of the dome, said dome defining a plurality of anchor roof points, and a suspension system for said mechanism comprising a plurality of suspension units, each extending from a corresponding one of a number of support points on said structure to a plurality of said anchor roof points, and comprising a plurality of upright tie rods extending towards said dome non-radially thereof, a plurality of connections between said tie rods and the latter anchor roof points respectively extending radially of said dome and tie rod connecting means between said upright tie rods and said dome and extending laterally of said upright tie rods for taking up the non-radial components of the stresses transmitted from said upright rods to said radial connections.

10. A material handling system comprising a stacker, means supporting said stacker substantially horizontally for rotation about an axis above the ground and having a conveyor for carrying material from a region near said axis in a radially outward direction along said stacker to a discharge region of said stacker, a reclaimer located below said stacker, means supporting said reclaimer above the ground for rotation about said axis and having a conveyor for carrying material from a region intermediate the ends of said reclaimer in a radially inward direction towards said axis, a conveyor below the level of said reclaimer located in position to receive the discharge from the reclaimer conveyor and radiating outwardly from a region near said axis to a delivery point outside the ambit of said stacker and said reclaimer, an enclosure for said stacker and said reclaimer having a roof defining a plurality of anchor roof points, said stacker supporting means comprising a stationary structure on which the rotary part of the stacker is supported for rotary movement, and suspension means between each of a plurality of spaced support points on said stationary structure and a plurality of said anchor roof points for dividing the stress transmitted by the load from said support point on said stationary structure and distributing the divisions of stresses to the latter plurality of spaced points in predetermined proportions, said stacker so suspended and said reclaimer being free to rotate in the same directions continuously through successive circuits without obstructions from any support means for said stacker or said reclaimer.

11. A material handling system according to claim 10, said suspension means comprising a whipple-tree suspension unit.

12. A material handling system according to claim 10, said enclosure being a circular self-supporting dome.

13. In combination, an operational mechanism having parts which move in the operation of the mechanism and having a structure substantially stationary in relation to said movable parts and on which the load from said mechanism is transmitted with varying intensity according to the operation of said movable parts, said structure defining at least three spaced suspension points, which in plan view are non-aligned and which are distributed on said structure to achieve stable support of said operational structure when supported upwardly from said suspension points, a support forming a roof over said operational mechanism, substantially stationary in relation to said structure, and having a plurality of groups of anchor means affording a corresponding plurality of groups of anchor points, the number of groups corresponding to the number of suspension points, the anchor points in each group including at least three anchor points, non-aligned in plan view, whereby said anchor points are distributed over a substantial area of said support, and a system for suspending said operational mechanism from said support comprising a plurality of suspension units, corresponding in number to the number of suspension points on said structure, each suspension unit extending from a corresponding suspension point to the anchor points of a corresponding group of anchor points, and comprising an assembly of whipple-trees multi-ply coordinated to effect predetermined proportional stress division and distribution of the load from the latter suspension point to the anchor points of the corresponding group of anchor points.

14. The combination described in claim 13, said support constituting an elastic structure capable of withstanding limited deflections.

15. The combination described in claim 13, said support constituting a circular, self-supporting dome.

16. The combination described in claim 13, wherein the whipple-trees in each of said suspension units are levered to divide the stress and distribute the load from the corresponding suspension point to some of the anchor points of the corresponding group of anchor points unequally.

References Cited by the Examiner

UNITED STATES PATENTS

| | | |
|---|---|---|
| 1,562,265 | 11/1925 | Stebbins. |
| 1,757,343 | 5/1930 | Steinmuller _____ 248—17 X |
| 1,956,502 | 4/1934 | Galatowitsch. |
| 3,049,244 | 8/1962 | Hansen _____ 214—10 |
| 3,063,519 | 11/1962 | Richter _____ 52—81 |

FOREIGN PATENTS 146,852  7/1921  Great Britain.

MARVIN A. CHAMPION, *Primary Examiner.*